Jan. 26, 1965   S. CZIKE ETAL   3,167,058
ROTARY FOUR-CYCLE INTERNAL COMBUSTION ENGINE
Filed June 27, 1962   3 Sheets-Sheet 3

INVENTORS
SANDOR CZIKE
BY  GABOR CZIKE
By Irwin S. Thompson
ATTY.

United States Patent Office 3,167,058
Patented Jan. 26, 1965

3,167,058
ROTARY FOUR-CYCLE INTERNAL
COMBUSTION ENGINE
Sándor Czike and Gábor Czike, both of
7 Marvany U., Budapest II, Hungary
Filed June 27, 1962, Ser. No. 205,757
Claims priority, application Hungary, July 4, 1961,
Cl 378
1 Claim. (Cl. 123—44)

This invention relates to rotary four-cycle internal combustion engines of the trochoidal type having a stationary casing and a rotor arranged for rotation therein.

As is known, trochoidal engines are designed to eliminate the necessity of employing valves which are inconvenient as regards their construction and their reliability. Instead, the stationary casing of the engine is provided with control ports for an otherwise unchanged four-cycle operation which results in an improvement of charging as well as in a decrease on engine weight per horse power since employment of large port areas and of suitably high speeds are rendered possible. However, serious difficulties are met with in properly sealing the rotor against its stationary casing as well as the working chambers against one another which necessitates otherwise undesirably high rotor speeds.

The main object of the present invention is to provide a rotary four-cycle engine with port control with which a reliable sealing between rotor and stationary casing is readily feasible, as it were, in a conventional manner. In compliance with the main feature of the present invention, this is obtained by a new combination of the principles dealing with cylinder and rotor design, more particularly by employing a rotor consisting of a system of cylinders arranged for rotation within said casing around an axis of rotation, pistons slidably arranged in said cylinders, a main shaft rotatably arranged in said casing and connected with said pistons by a drive, a rotary surface of revolution on said rotor coaxial with said axis of rotation, a stationary surface of revolution in said casing disposed coaxially with and surrounding said rotary surface of revolution on said rotor, said stationary casing with said stationary surface of revolution forming a stationary cylinder head for said rotary system of cylinders, control ports in said stationary surface of revolution controllable by said rotor, and a positive transmission between said rotor and said main shaft.

With such arrangement, the cylinders of the engine necessarily occupy radial positions with respect to said stationary surface of revolution whereby sealings between casing and rotor in the manner of usual sealing rings are rendered possible as will be described hereinafter in greater details. Such sealing permits the selection of optimum speed values since too high speeds otherwise unavoidable for sufficient sealing action can be dispensed with whereby also transmission problems become greatly moderated. Furthermore, considerable neutral angular sectors are at a disposal for the provision of large area inlets and outlets for induction and exhaust, respectively. Hereby, ideal filling conditions can be obtained and power losses caused by exhausts against atmospheric pressure can practically be obviated.

Still another object of the present invention is to provide spherical stationary and rotary surfaces of revolution since they permit the employing of simple sealing rings between rotary cylinders and their stationary cylinder head whereby most preferable sealing conditions can be obtained between rotor and stationary casing.

A further object of the present invention is to provide unslit sealing rings between said cylinders and said stationary spherical surface, said unslit sealing rings lying with their axially outer front surfaces against stationary spherical surface, and slit sealing rings between said cylinders and said unslit sealing rings snugly fitting the latter in their common radial directions.

A still further object of the present invention is to provide rotors the cylinders of which form a rigid system. Such rotors are capable of being constructed by employing conventional component parts so that no special machine tools are necessary for their manufacture.

Another object of the present invention is to provide rotors the cylinders of which are arranged for radial displacements in said system whereas their pistons are journalled to piston rods which form a rigid system with one another. With such arrangement, a number of fulcrums may be dispensed with which has obviously various advantages.

Further objects and features of the present invention will be described by taking reference to the accompanying drawings which show, by way of example, various embodiments of the rotary four-cycle internal combustion engine according to the invention, and in which.

The same reference numerals refer to similar details through the drawings wherein.

Figure 1:
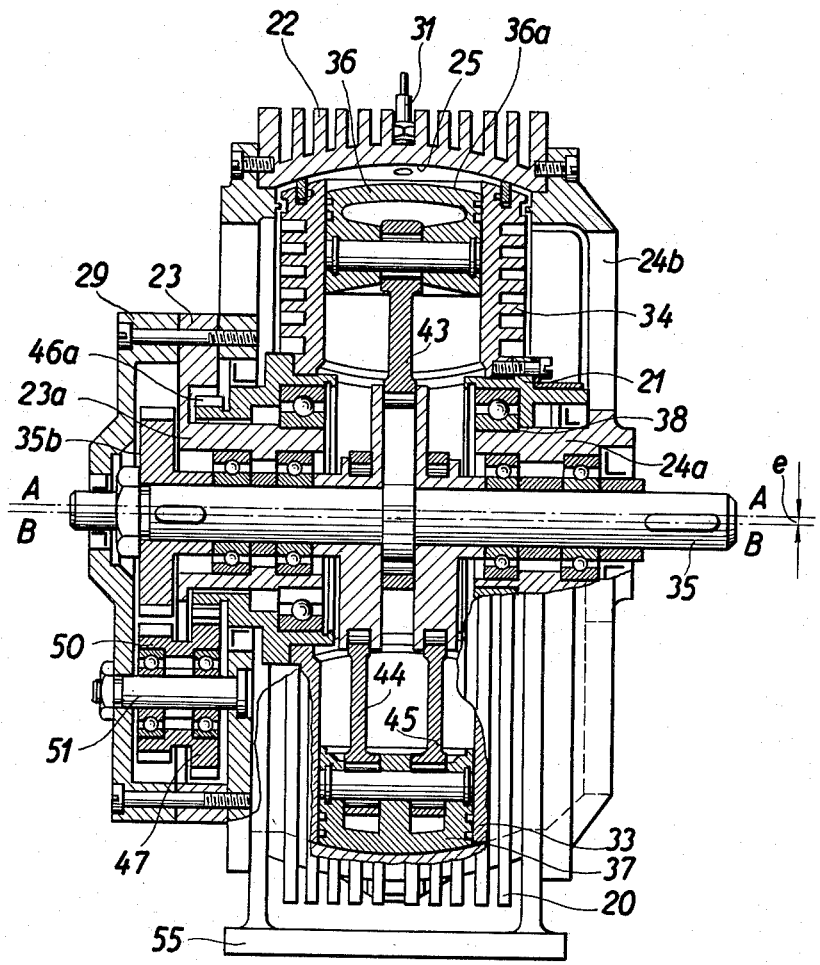
FIG. 1 is a longitudinal sectional view of a first exemplified embodiment taken along line I—I of FIG. 2.

The numeral 20 designates a stationary casing of a rotary four-cycle internal combustion engine according to the invention, having a rotor 21 arranged for rotation in said stationary casing. In the present embodiment, the rotary internal combustion engine is shown as an explosion motor in which the casing consists of an annular body the external surface of which is provided with cooling fins or ribs 22. In an axial direction, the casing 20 is covered by lids 23 and 24. Its inner side is provided with a stationary surface of revolution 25 which, with the represented embodiment forms a spherical zone around an axis of rotation A—A. This stationary surface of revolution 25 is provided with ports 26, 27, 28 of which the relatively large port 26 serves as a control port for the admission of a mixture of fuel and air, the very small port 27 is intended for ignition purposes, and the largest port 28 is provided likewise as a control port for the exhaust of combustion gases. Accordingly, the control port 26 has a carburetor 30 of known construction connected to it whereas the port 27 is provided with a usual spark plug 31.

In the represented embodiment, the rotor 21 consists of a system including a pair of cylinders 33 and 34 arranged for rotation around said axis A—A. In the cylinders 33 and 34 there are pistons 36 and 37, respectively, which are connected by a drive, more particularly by a usual crank drive with a main shaft 35 having an axis of rotation B—B. The rotor 21 is provided with an external rotary surface of revolution 40, interrupted only at the cylinders 33 and 34. Antifriction bearings 38 serve for supporting the rotor 21 in the stationary casing 20 on hubs 23a and 24a with an annular interstice coaxial with said axis of rotation A—A being left between the casing's stationary surface 25 and the rotor's surface 40 the width of which amounts to about 0.05 millimeter as soon as stationary or steady thermal conditions prevail.

Figure 4:
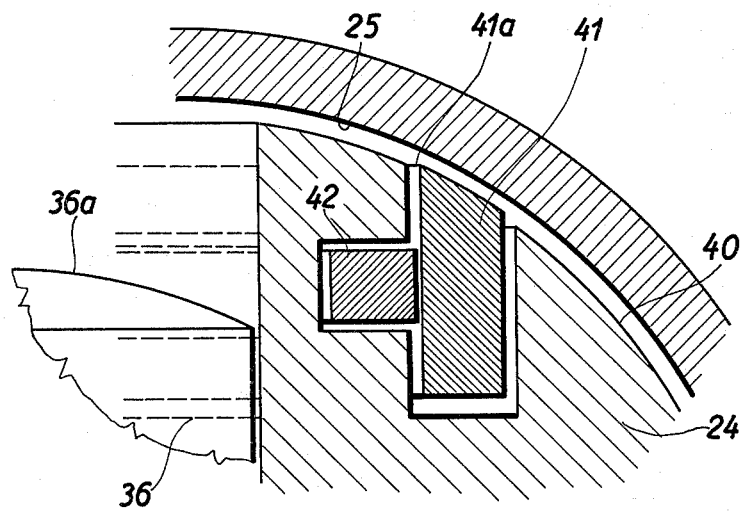
FIG. 4 shows a detail of FIG. 2 at a larger scale.

The sealing between the pistons and the cylinders is effected in the conventional manner. However, since the stationary surface 25 of the casing 20 being, at the same time, and acting as a sort of stationary cylinder head for the rotating cylinders 33 and 34, it is necessary to provide a sealing between said cylinders and said stationary surface. In the instant case, pairwise arranged sealing rings 41 and 42 are provided for such purpose as particularly illustrated in FIG. 4. Of these rings, ring 41 is an unslit sealing ring which lies with its axially outward annular front surface 41a against said stationary surface 25. The other ring 42 is of the usual slit piston sealing ring type which lies with its outer side surface against the inner side surface of the previously mentioned unslit ring 41 so that—in their common radial directions—the former snugly fits the latter. With relatively small outputs, it is possible to have the rotor 21 by means of its rotary surface 40 lie against the stationary surface 25 of the casing in which case the stationary surface and the rotary surface slide on one another.

The pistons 36 and 37 of the cylinders 33 and 34 are, in opposed-piston arrangement of a single influence line, connected by means of piston pins 33a, 34a and piston rods 43 as well as 44 and 45, respectively, with crank arms of the main shaft 35 in the usual manner. Thus, a more exact description of the crank drive may be dispensed with.

Figure 3:
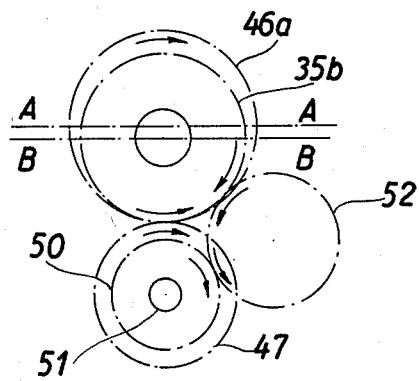
FIG. 3 is a schematic view of a detail of the same exemplified embodiment.

Furthermore with the represented embodiment, both cylinders 33 and 34 are connected through a sort of crank chamber 46 so as to form a rigid system with one another. The crank chamber 46 carries a gear rim 46a (FIG. 3) which engages a spur gear 47 supported in the lid 23 and in a further lid 29 connected to and forming with the former a gear box. The spur gear 47 engages a spur gear 50 mounted on a shaft 51. The spur gear 50 engages a spur gear 52 which, in turn, engages a gear rim 35b of the main shaft 35. Obviously, such transmission between rotor 21 and main shaft 35 works as a reversing gear. Dimensions are selected so as to obtain a transmission ratio of 1:1 between rotor 21 and main shaft 35.

Figure 2:
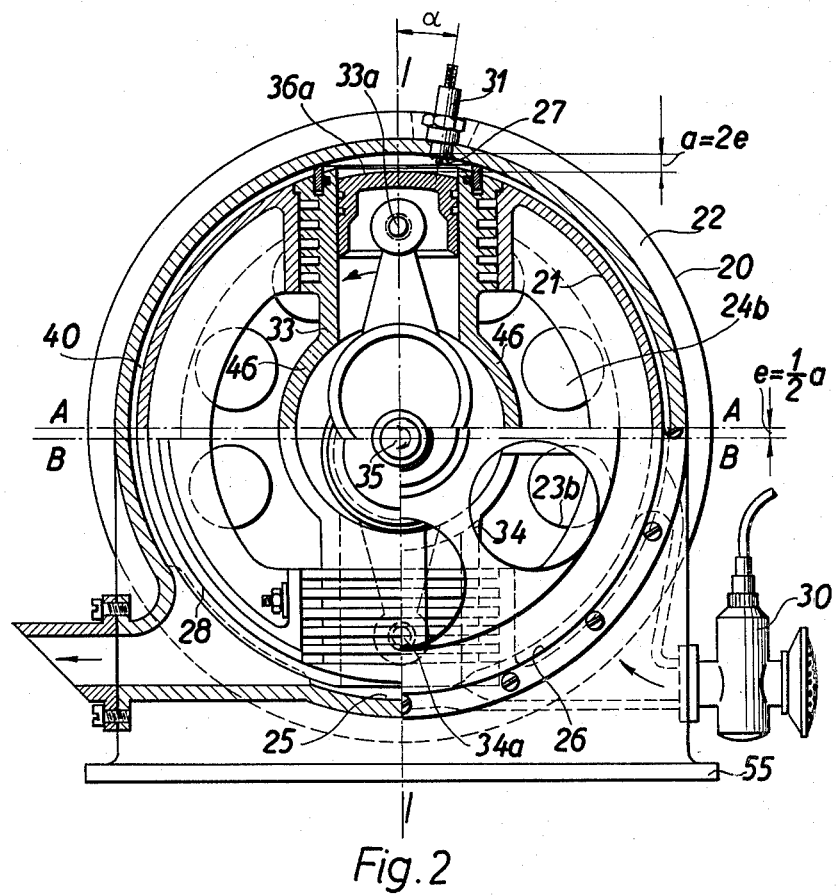
FIG. 2 is a side elevational view to FIG. 1 partly in section.

The lids 23 and 24 are provided with passages 23b and 24b, respectively, for ventilating purposes (FIG. 2). With the represented embodiment, ventilation can be enhanced by the provision of fan blades mounted on the rotor 21.

As can be seen particularly from FIGS. 1 and 2, rotor axis A—A and main shaft axis B—B are parallel to one another and separated by a distance e. Such eccentricity e is selected so that in the outermost dead center positions of pistons 36 and 37 associated with the end of their expansion strokes it amounts to half the axial distance a between the piston crown and stationary surface 25. Moreover, the piston crowns (e.g. 36a) are, in the instant case, provided with an arched surface, the radius of curvature thereof being equal to the radius of curvature of the stationary surface 25. Consequently, in the outermost dead center positions of the pistons 36 and 37 associated with their exhaust strokes, their arched piston crowns snugly fit the stationary surface 25 whereby combustion gases will completely be expelled from the work chambers of the cylinders 33 and 34. Such piston position is illustrated by piston 36 in FIGS. 1 and 2.

Reference character 55 designates a portion of the casing 20 which serves as a socket.

Cooling of the engine is effected by means of the above mentioned cooling ribs or fins 22 which are provided along the whole circumference of the stationary casing 20. Each cylinder covering a fourth of a circular arc during an expansion stroke, the cooling surface of casing 20 (which serves as a cylinder lid) amounts to 2.5 to 3.5 times the cooling surface on the cylinder head of conventional engines with stationary cylinders. Thus, smaller units according to the invention may have no water cooling jackets at all. The cylinders are provided with cooling fins of known construction. Although the rotor 21 rotates at a relatively high speed and, thus, the cooling fins of the cylinders have very high peripheral speeds of about 40 meters per second, it is, with respect to a relatively closed structure of the engine, preferable to increase the air flow also by mechanical means. In the instant case, the fan blades on the rotor serve for such purpose. Hereby, a vigorous air flow is obtained in a well defined direction so that warm air is compelled to flow between the fan blades of the cylinders through the passages 23b and 24b of the lids 23 and 24, respectively, and to escape at increased flow velocities.

The large flow areas formed by the intake control port 26 and the exhaust control port 28, respectively, permit the charging and emptying of the cylinder working chambers at losses which are substantially smaller than with ventilated engines having flow areas which are necessarily more limited. Moreover, a substantially purer and cooler mixture of fuel and air can be introduced herein than is possible even with the conventional four-cycle engines with ventilated control. Such favorable conditions are due to the absence of dead spaces at the end of the exhaust strokes whereby the working chambers are completely emptied for receiving fresh mixture of fuel and air so that neither the amount nor the purity and the temperature of the introduced mixture will be impaired which is inevitable with usual four-cycle engines as is known to those skilled in the art. Such preferable charging conditions permit an increase of 25 to 38% of the charge volume. A lower temperature of the charge entails a correspondingly higher density whereby an increase of 14% of the charge volume is obtained. Furthermore, due to lower final temperatures, a danger of self-ignition is considerably decreased which permits the employing of higher compression pressure values at like fuel qualities (octane number). Obviously, such features of the rotary four-cycle internal combustion engine according to the invention entail a considerable decrease of engine weight per horse power.

Furthermore, all component parts of the engine according to the invention are obviously of types usual with the construction of internal combustion engines so that no special machine tools or methods of manufacture are needed for building such engines.

What we claim is:

In a rotary internal combustion engine having a casing providing a spherical surface, a rotor having radially disposed cylinders mounted for rotation within said casing whereby the axes of said cylinders pass through a center portion of said surface, the improvement comprising the provision of sealing rings between said cylinders and said surface, one of said rings being unslit and having an annular surface engaging said spherical surface and another of said rings being slit and having an outer surface abutting and snugly engaging said unslit ring inwardly of its annular surface.

References Cited in the file of this patent

UNITED STATES PATENTS

| | | |
|---|---|---|
| 1,042,675 | Helmes | Oct. 29, 1912 |
| 1,060,297 | Tangeman | Apr. 29, 1913 |
| 1,138,388 | Levering | May 4, 1915 |
| 1,282,745 | Brown | Oct. 29, 1918 |
| 1,331,749 | Preer | Feb. 24, 1920 |
| 1,598,518 | Braley | Aug. 31, 1926 |
| 1,915,582 | Sklenar | June 27, 1933 |
| 1,918,174 | Berggren | July 11, 1933 |

FOREIGN PATENTS

| | | |
|---|---|---|
| 1,014,411 | France | Aug. 14, 1952 |